(12) United States Patent
Nevalainen et al.

(10) Patent No.: US 8,642,101 B2
(45) Date of Patent: Feb. 4, 2014

(54) POLYMER-COATED LIQUID PACKAGING BOARD, A PACKAGE FORMED FROM IT AND THE USE OF THE POLYMER

(75) Inventors: Kimmo Nevalainen, Kotka (FI); Tapani Penttinen, Huutjarvi (FI); Janne Pynnonen, Espoo (FI)

(73) Assignee: Stora Enso Oyj, Helsinki (FI)

( * ) Notice: Subject to any disclaimer, the term of this patent is extended or adjusted under 35 U.S.C. 154(b) by 135 days.

(21) Appl. No.: 12/307,616

(22) PCT Filed: Jun. 6, 2007

(86) PCT No.: PCT/FI2007/000160
§ 371 (c)(1),
(2), (4) Date: Jan. 6, 2009

(87) PCT Pub. No.: WO2008/012395
PCT Pub. Date: Jan. 31, 2008

(65) Prior Publication Data
US 2009/0258119 A1 Oct. 15, 2009

(30) Foreign Application Priority Data

Jul. 28, 2006 (FI) .................................... 20060705

(51) Int. Cl.
*B65D 65/20* (2006.01)
*B65D 81/24* (2006.01)
*B65D 85/72* (2006.01)
*B32B 27/30* (2006.01)

(52) U.S. Cl.
USPC ....... 426/127; 426/133; 206/524.6; 229/5.81; 229/5.84; 229/125.42; 428/34.2; 428/34.3; 428/35.4; 428/35.7; 428/36.7

(58) Field of Classification Search
USPC ................ 106/162.5, 163.01, 164.01, 190.1, 106/200.2, 203.3, 270; 206/58, 117.4, 119, 206/205, 219, 222, 419, 431, 432, 509, 206/524.6, 585, 594, 802, 813, 815, 820; 229/5.81, 5.84, 5.85, 103.3, 117.12, 229/120.011, 122.34, 125.42, 184, 185, 229/185.1, 213, 249, 521.8, 521.9, 524.4, 229/524.6; 249/91, 92, 144, 146, 210; 264/41, 118, 129, 188, 197, 198, 264/209.1, 340, 447, 483; 426/1, 2, 8, 57, 426/87, 92, 96, 103, 104, 105, 106, 113, 426/115, 124, 127, 129, 132, 133, 135, 138, 426/140, 241, 243, 250, 262, 268, 271, 284, 426/315, 324, 383, 397, 398, 399, 410, 413, 426/420, 424, 437, 513, 516, 540; 428/34.1, 34.2, 34.3, 34.4, 34.8, 34.9, 428/35.2, 35.4, 35.7, 36.6, 36.7, 58, 120, 428/182, 212, 219, 323, 341, 348, 349, 446, 428/474.4, 507, 514, 522; 524/210, 480, 524/563; 525/186, 242; 526/187
See application file for complete search history.

(56) References Cited

U.S. PATENT DOCUMENTS

| | | | |
|---|---|---|---|
| 3,060,045 A * | 10/1962 | Malakoff et al. | 106/270 |
| 3,160,341 A * | 12/1964 | Cherney | 229/117.12 |
| 4,513,036 A | 4/1985 | Thompson et al. | |
| 4,701,360 A | 10/1987 | Gibbons et al. | |
| 4,777,088 A | 10/1988 | Thompson et al. | |
| 4,859,513 A | 8/1989 | Gibbons et al. | |
| 4,880,701 A | 11/1989 | Gibbons et al. | |
| 4,888,222 A | 12/1989 | Gibbons et al. | |
| 4,921,733 A | 5/1990 | Gibbons et al. | |
| 4,940,612 A | 7/1990 | Gibbons et al. | |
| 4,977,004 A | 12/1990 | Bettle, III et al. | |
| 4,981,739 A | 1/1991 | Gibbons et al. | |
| 5,059,459 A | 10/1991 | Huffman | |
| 5,728,249 A * | 3/1998 | Kinsey et al. | 156/275.1 |
| 5,993,977 A * | 11/1999 | Laiho et al. | 428/514 |
| 6,534,139 B1 | 3/2003 | Gibbons et al. | |
| 2002/0004568 A1 * | 1/2002 | Cohen et al. | 526/187 |

| | | | |
|---|---|---|---|
| 2002/0136878 | A1 | 9/2002 | Salste et al. |
| 2004/0245138 | A1 | 12/2004 | Penttinen et al. |
| 2005/0175817 | A1 | 8/2005 | Lahti et al. |

FOREIGN PATENT DOCUMENTS

| | | | |
|---|---|---|---|
| EP | 0 241 819 A2 | 10/1987 | |
| EP | 0 630 745 A1 | 12/1994 | |
| EP | 1 059 162 A2 | 12/2000 | |
| EP | 1 092 526 A1 | 4/2001 | |
| EP | 1 595 802 A2 | 11/2005 | |
| JP | 63-3950 A | 1/1988 | |
| JP | 2-84331 A | 3/1990 | |
| JP | 9-500067 A | 1/1997 | |
| JP | 2001-505142 A | 4/2001 | |
| JP | 2005-505476 A | 2/2005 | |
| JP | 2005-513549 A | 5/2005 | |

\* cited by examiner

*Primary Examiner* — Rena Dye
*Assistant Examiner* — Daniel M Propster

(74) *Attorney, Agent, or Firm* — Birch Stewart Kolasch & Birch, LLP

(57) ABSTRACT

The object of the invention is a liquid packaging board (1), wherein the base board (3) is provided with at least one polymeric coating layer on both sides thereof to decrease the flavor scalping from a packaged liquid, such as citrus fruit juice. Inside the baseboard, there is a layer (6) of ethylene methyl acrylate copolymer either in a direct contact with the packaged liquid or coated with a thin layer of polyolefin. The invention also relates to a closed package for liquid food that is formed from the liquid packaging board (1) by folding and seaming, wherein the side that comes in contact with the food product, correspondingly, comprises an EMA layer and, possibly, a thin polyolefin layer on top of the same. The invention further comprises the use of EMA in decreasing the flavor scalping from the packaged liquid by the packaging material.

6 Claims, 1 Drawing Sheet

POLYMER-COATED LIQUID PACKAGING BOARD, A PACKAGE FORMED FROM IT AND THE USE OF THE POLYMER

The invention relates to a liquid packaging board that is in the form of a web or a packaging blank and comprises a base board and one or more polymeric coating layers on both sides thereof. The invention also relates to a closed package for a liquid food product, which is formed by folding and heat sealing from the polymer-coated packaging board that comprises the base board, the polymer layer outside the base board that forms the outer surface of the package, and at least one polymer layer inside the base board in the package. The invention further relates to the use of a specific polymer as a coating on the liquid packaging board or the liquid package.

The package, which is folded from the board and seamed, constitutes one known way of packaging liquid food products to be sold in consumer packages. A special application of the invention comprises a package for juices, such as those made of citrus and other fruit. The manufacturing material of such a package, the liquid packaging board, must fulfil certain criteria so that it can be used for the purpose in question. To meet the various requirements, the packaging materials usually comprise a sandwich structure that has typically been processed by joining various layers together, each of them having their respective functions in controlling the properties of the packaging material.

The compatibility of the foodstuff that is to be sold and the material of the package constitutes one of the main aspects of the design. The flavour of the product that is sold should not change under the effect of the sales package so that the package either delivers or transmits flavour components to the product or scalps the flavour components from the product or, at the worst, the package both delivers and scalps the flavour components. In the case of juices, one such known flavour component is the oil of orange, which corresponds to D-limonene, the scalping of which by the liquid packaging board has been studied. In the studies, it was observed that certain polymer coatings of the liquid packaging board are susceptible to scalping or skimming this flavour component from the juice itself during the time between packaging and the use of the juice.

In the life span of the package, there are also other stages that make their own demands on the packaging material. Roughly classified, the package is first manufactured, then the product to be sold is packed, transported and stored for sale; after the sale, the product is transported by the consumer to the destination of use, stored and used and, finally, the empty package is disposed of. In the following, the demands made by these various stages on the package itself and its manufacturing material are presented in brief.

First, the web-like liquid packaging base board is converted into the liquid packaging board according to the actual application by coating it with a sealing layer, such as a liquid barrier layer, which also provides the heat-sealability of the package. Typically, this is carried out by means of extrusion coating, whereby one or more layers of a suitable coating are provided on the surface of the board. In the further processing after the coating, the web can be cut into the form of blanks, whereby instead of processing the web-like product, single blanks will be processed. In that case, the friction coefficient between the blanks is a matter that should be taken into consideration. It would be desirable to have a friction coefficient of about the same order as that of the other blanks that are processed on the same manufacturing line, whereby the production machines do not need to be separately adjusted for certain grades of blanks. Polyolefins, such as polyethylene (PE), comprise one of the most typical coating materials of boards; therefore, the friction coefficient of a PE-coated board is a good reference value when assessing the processability.

The blank that has the shape of the package, which is needed, is folded from the plate-like blank, its seams being joined in a fluid-tight manner. Joining of the seams, i.e., seaming, is typically carried out by heat sealing. In that case, the coating of the liquid packaging board is melted and pressed together by means of compression and heat. In most packages that are folded from board, the seams are made by means of the coating on both sides of the board. Thus, in practise, the polymer coating on both sides of the board must be heat-sealable both with itself and the polymer coating on the opposite side of the board. The desired properties of the seaming include a reliable and tight seam and the fact that the seaming temperature is not too high. A low seaming temperature facilitates the production process of the package and causes no changes, for example, in the base board made of a fibrous material or the other coating components of the multi-layer coating.

The package is transported and stored in various stages and conditions, whereby both varying mechanical stresses and various environmental effects, such as changes in the temperature, changes in the ambient moisture, odours and the like are directed to the package. Naturally, the package should try to protect the product against such external factors as well as possible, but it is also desirable that the package itself remain its external appearance as good as new.

A lot of packages for liquid foodstuffs are described in the patent literature. Publication EP 630 745 B2 describes a packaging board intended as the packages of liquid foodstuffs, such as citrus fruit juices, the board inside the package being coated with an oxygen barrier layer made of ethylene vinyl alcohol copolymer (EVOH), a tie layer, and a heat-sealable layer of low density polyethylene (LDPE) and, on the opposite side that constitutes the outer surface of the package, with a heat-sealable layer of LDPE. This publication does not mention the prevention of the flavouring agents contained in the juice from being scalped by the packaging material.

U.S. Pat. No. 4,977,004 seeks for a solution to the scalping problem of the components contained in drinks, such as orange juice, According to the specification, the polyethylene coating of the board-based packaging material selectively scalps orange oil from the orange juice, which is why the quality of the juice deteriorates with time. The specification presents a solution comprising a sandwich structure of the packaging material, wherein a thin layer of EVOH is arranged innermost in touch with the packaged juice, and a layer of adhesive, a second layer of EVOH and a layer of LPDE, respectively, are arranged in the material inside the same. On the outer surface of the presented packaging board, there is a heat-sealable layer of LPDE. The inner LPDE layer of the base board is intended as a moisture barrier.

Generally, the coating layer of polyethylene terephthalate (PET), which is arranged so as to be the inner surface of the package, is considered the most effective in preventing the flavour scalping of juice. For example, specification U.S. Pat. No. 6,534,139 B1 describes a coated packaging board comprising a layer of EVOH that works as an oxygen barrier against the base board, and on top of that, a layer of heat-sealable PET that forms the inner surface of the package. Because of its high melting point (about 250° C.), PET is generally considered non-heat-sealable and it is obvious that the heat-sealable PET mentioned in the specification is not as easily melting and heat-sealable than the LDPE, which is more generally used in sealing (its melting point being about 110° C.).

Publication EP 1059162 A2 presents liquid crystalline polymers (LCP) as coating polymers that prevent the flavour scalping by the packaging board. They have been said to be comparable to polyethylene terephthalate (PET) in terms of their non-scalping properties. However, the disadvantages of LCP include problems in its extrusion property and heat-sealability. According to the publication, LOP must be extruded onto a substrate from a very short distance for it not to crystalline too early. The heat sealing of the polymer coating containing LCP, in turn, requires sealing by ultrasound. There can also be a risk of the layer breaking when the packaging material blank is folded into a package, if the LCP layer is not thin enough.

Publication U.S. Pat. No. 4,981,739 describes a heat-sealable packaging board having oxygen and flavour barrier properties, its base board comprising 6 or 7 superimposed polymer layers. The publication mentions ethylene methyl acrylate copolymers as a possible caulking polymer, even though it suggests that ionomer resins (Surlyn) be the primary caulking polymer. For the heat sealing, a layer of LDPE is arranged for the inner surface of the package, having a thickness of at least about 19 g/m$^2$ (12 lbs/3000 ft$^2$), However, such a thick layer of LDPE strongly absorbs the flavouring agents of the juice, for example.

Thus, the purpose of the invention is to provide a solution that avoids the problems of the known technology described above and provides a polymer-coated packaging material, which can easily be manufactured by polymer extrusion and is easy to heat seal, and a closed package for liquid food, which is formed therefrom and wherein the flavour scalping of the packaged citrus juice or a similar food product by the polymer coating of the packaging material is sufficiently low so as to preserve the quality of the food product.

The object of the invention is to improve the aspects related to the scalping of D-limonene, in particular, i.e., to offer an alternative and more advantageous solution to the expensive multi-layer structures, which, however, is technically competitive with those mentioned above. Another object is to provide a solution to the beverage industry, which is easy to apply to production and has processing properties that correspond to the processing of basic liquid packaging boards in the production process. Naturally, the object is to provide a solution that is in accordance with the valid orders of the authorities and the directives related to the food packages.

The liquid packaging board according to the invention is characterized in comprising a layer that contains ethylene methyl acrylate copolymer (EMA) and is arranged on the inside of the base board to decrease the flavour scalping from the packaged product in the package. The liquid package according to the invention, In turn, is characterized in comprising a layer that contains ethylene methyl acrylate copolymer (EMA) and lies on the inside of the base board to decrease the flavour scalping from the packaged product.

The invention is based on the observation that the flavour scalping of the juice by EMA is considerably lesser than that by polyolefin, such as LDPE, which is generally used in the surface layer of polymer-coated packaging boards. One advantage of EMA is its low melting point that approximately corresponds to LDPE, therefore, similarly to LDPE, EMA is easy to heat seal and not difficult to extrude. In these respects, EMA is a considerable improvement over PET and LCP, which have earlier been used for the purposes of low scalping.

According to the invention, it has also been observed that the low flavour scalping, which is the object, is achieved not only when the layer of EMA on the inner surface of the package is in direct contact with the packaged liquid, but also when the EMA layer is covered with a thin layer of polyolefin, such LDPE, which constitutes the inner surface of the package. As the polyolefins themselves are stronger in scalping the flavour components than EMA, the layer thickness of the polyolefin must be kept low, preferably 1 to 10 g/m$^2$, more preferably 1 to 7 g/m$^2$, and most preferably 2 to 5 g/m$^2$.

Regarding the prior art, publication U.S. Pat. No. 5,728,249 presents a milk packaging board, its polymer coating comprising an EMA layer so as to enable the radio frequency (RF) sealing of the board. Publication EP 1 595 802 A2 presents a paperboard-based drink package, its inner surface comprising a sealable EMA layer and a metal layer under the same. Neither publication mentions a package for citrus juice, and the issue therein is not how to lower the scalping of flavouring agents, such as D-limonene.

Publication EP 1 092 526 A1 teaches the use of EMA as the breaking inner surface of the cover of a juice package that comes off by pulling. The inner surface of the actual package container consists of a heat-sealable layer of HOPE or LDPE. The publication contains no mention of the anti-scalping properties of EMA.

To achieve, for the liquid packaging board, the oxygen barrier that is also important for preserving the quality of the packaged product, the board can comprise at least one polymeric oxygen barrier layer between the base board and the layer containing EMA. Suitable materials for the oxygen barrier layer include ethylene vinyl alcohol copolymer (EVOH) and polyamide (PA). By means of these oxygen barrier polymers, the use of a metal, such as aluminium foil, in the juice packages according to the invention can be avoided.

The opposite side of the liquid packaging board according to the invention, which will be the outer surface of the product package, can be provided with a heat-sealable layer of polyolefin, such as LDPE. The polyolefin layer of the outer surface is easy to seam to the EMA layer on the inner surface of the package or to the thin layer of polyolefin, which in that case is preferably the same polyolefin than the heat-sealable layer of the outer surface.

The portion of methyl acrylate monomer in commercial EMA polymers varies. The commercial grades, wherein the portion of said monomer is 9 to 20 mole percent are suitable for the invention, among others.

The invention also comprises the use of EMA to decrease the scalping of flavouring agents, such as D-limonene, from the product, such as citrus fruit juices, which are packed in the liquid packaging board that is provided with the polymer coating layers, or in the closed liquid package that is formed therefrom. As already mentioned, EMA can be used on the inner surface of the package in direct contact with the packaged liquid, or the EMA layer can be covered with a thin layer of polyolefin with a weight of preferably 10 g/m² at the most, which in that case forms the inner surface of the package. The liquid packages comprise, e.g., packages with the form of a rectangular prism or a tetrahedron, as well as gable-top packages.

The invention thus provides the packaging board and the liquid package according to the object for citrus juices, in particular, the flavour scalping of which by conventional packages has been greater than desired, except for some extremely complex multi-layer structures. If the multi-layer coating according to the invention includes the EVOH or PA oxygen barrier layers, excellent oxygen, flavour and water vapour barrier properties are also achieved, whereby the storability and the possible shelf life of the product, which is to be sold, from the manufacture to the best before date are as long as possible. The invention provides a liquid packaging board, which can be directly applied to production in present conversion lines to be converted into liquid packages without the adjusting stage that wastes production time and production. Certain further forms of application also enable the package to be used in tropical conditions, wherein the climatic factors must be considered with special care. In addition to the citrus fruit juices, packaged products, such as other fruit and berry juices, juice soups, and wines, could also be considered, Regarding its liquid-tightness and wet strength that are provided by means of filling agents, the liquid package base board differs from the other conventional boards. The liquid package base board as such is liquid-proof and wet-strong; however, it does not yet have all the properties needed in the application in question, such as the citrus juice application that is one object of this invention.

Compared with competing solutions, a good sealability is provided in the packaging board according to the invention, which is coated with EMA, whereby, for example, the seaming temperature or pressure hardly need to be changed from the production parameters conventionally used. Similarly, at a reasonable accuracy, the frictional properties of the EMA surface correspond to the generally used applications, which have a polyolefin surface. The sealing and frictional properties of the packaging board do not deviate at all from the conventional, if according to another basic application of the invention, the EMA layer is covered with a thin heat-sealing layer of polyolefin, such as LPDE.

In the following, the invention is described in detail by means of examples and with reference to the appended drawing, wherein FIG. 1 shows the sandwich structure of the polymer-coated liquid packaging board according to an embodiment of the invention;

Figure 1:
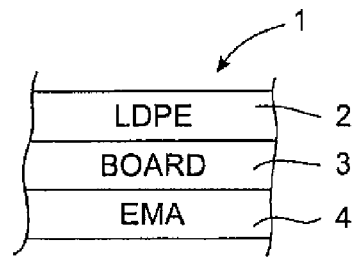

The polymer-coated liquid packaging board 1 according to FIG. 1 consists of a heat-sealable layer 2 of low-density polyethylene (LDPE), which is on the surface of the board, its weight preferably being 10 to 40 g/m², a base board 3, the weight of which can vary from 170 to 500 g/m², preferably from 225 to 350 g/m², and an ethylene methyl acrylate copolymer (EMA) layer 6 on the opposite surface of the board, its weight being 10 to 50 g/m², preferably 15 to 40 g/m², and most preferably 20 to 30 g/m². The described packaging board 1 is intended to be used for packaging a liquid food product so that the EMA layer 6 is on the inner surface of the package and the LOPE layer 2 on the outer surface of the package. The LDPE and EMA layers 2, 6 can be brought onto the base board 3 by extrusion.

Figure 2:
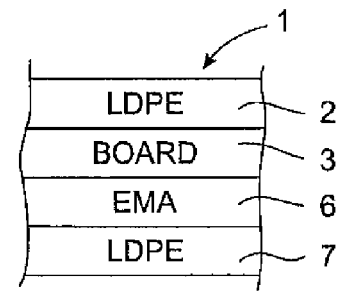
FIG. 2 shows a second embodiment of the invention, correspondingly.

The application of the invention according to FIG. 2 corresponds to that shown in FIG. 1, except that there is a thin layer 7 of low density polyethylene (LDPE) on top of the EMA layer 6. The LDPE layer 7, which is intended as the inner surface of the liquid package, can have a weight of 1 to 10 g/m², preferably 1 to 7 g/m², and most preferably 2 to 5 g/m2. The EMA and LDPE layers 6, 7 can be brought onto the base board 3 by coextrusion.

Figure 3:
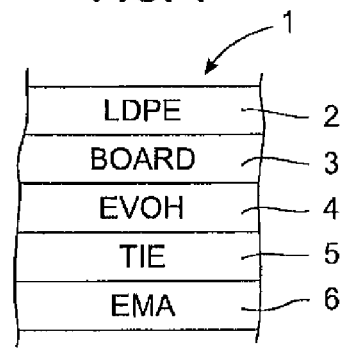
FIG. 3 shows a third embodiment of the invention, correspondingly.

The application of the invention shown in FIG. 3 differs from that in FIG. 1 so that an oxygen barrier layer 4 of ethylene vinyl alcohol polymer (EVOH) and a tie layer 5, which ties it to the EMA layer 6, are placed between the base board 3 and the EMA layer 6 that is intended as the inner surface of the package. The weight of the EVOH layer 4 can be 3 to 20 g/m2, preferably 5 to 10 g/m2. Suitable binders include, e g., polyethylene-based glues, the thickness of the layer 5 being, e.g., 1 to 10 g/m², preferably 2 to 6 g/M². The EVOH, tie, and EMA layers 4, 5, 6 can be brought onto the base board 3 by coextrusion.

Figure 4:
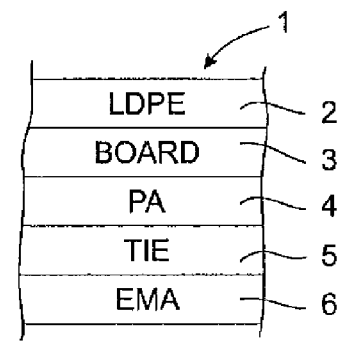
FIG. 4 shows a fourth embodiment of the invention, correspondingly.

The application of the invention according to FIG. 4 differs from that in FIG. 3 only in that, instead of EVOH, the polymer of the oxygen barrier layer 4' comprises polyamide (PA). The weight of the PA layer 4' can be 3 to 20 g/m², preferably 5 to 10 g/m².

Figure 5:
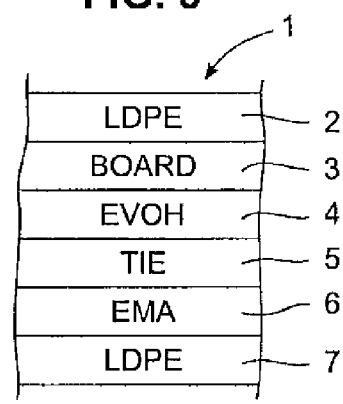
FIG. 5 shows a fifth embodiment of the invention, correspondingly.

The application of the invention shown in FIG. 5 comprises the sandwich structure of FIG. 3, supplemented with a thin LDPE layer 7, which is arranged on the inner surface of the package, according to the embodiment in FIG. 2.

Figure 6:
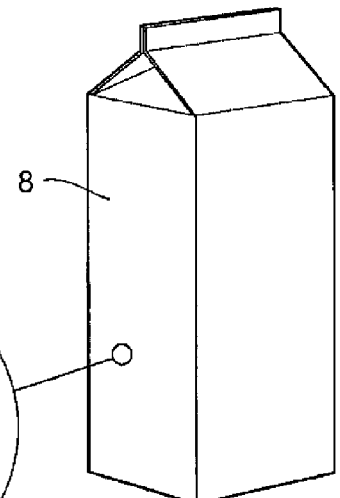
FIG. 6 shows a gable top-shaped liquid package according to the invention, consisting of the polymer-coated packaging board according to FIG. 3.
Figure 6:
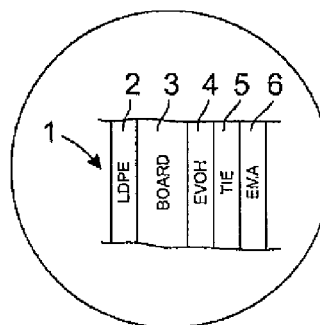

FIG. 6 shows a gable top-shaped juice package 8 formed form the liquid packaging board 1 according to FIG. 3, wherein the EMA layer 6 constitutes the inner surface of the package that is in contact with the juice, and the heat-sealing LOPE layer 2, which is brought onto the base board 3, constitutes the outer surface of the package. On the vertical seam of the package 8 (not shown), the LDPE and EMA layers 2, 6 of the outer and inner surfaces of the board are seamed to each other and, on the top 9 of the package, the EMA layer 6 of the inner surface of the board is seamed to itself.

In the heat-sealing layer 2 of the package's outer surface and in the thin polyolefin layer 7 constituting its inner surface, when used, a linear low density polyethylene (LLDPE) or polypropylene (PP) can be used as the polyolefin instead of LDP. When heat sealing these polyolefin layers 2, 7 to each other, also the EMA layer 6 at least partly melts, participating in the formation of the heat-sealed joint.

The content of the methyl acrylate monomer of the said EMA layer may vary, and grades with various methyl acrylate monomer contents are commercially available. An upper limit has been set (FDA, USA, among others) to the portion of methyl acrylate monomer in any material that gets in direct contact with the food product in the food package. Because of the processability and the frictional properties, it is also preferable to keep the portion of ethylene comonomers high. On the other hand, the desired effect on the preservability of the product's aromas and ingredients is not achieved, unless the MA content of the methyl acrylate monomer is of at least a certain magnitude. In the solution according to the invention, it is preferable that the content of methyl acrylate monomer (MA) in the outermost EMA layer 12 is 9 to 20 mole percent.

Example 1

The appended table shows an example using orange juice (Valio) and a simulator. The simulator was an aqueous solution of D-limonene containing 100 μL of limonene and 1.2 g of a surfactant (Tween 80) in 1 liter of solution, wherein the pH was adjusted to a value of 3.8 by 0.01M of HCl. The substrate comprises a liquid packaging base board with a basis weight of 300 g/m². The other surface of the substrate was coated with LDPE with a coating weight of 20 g/m². The opposite surface of the substrate, which comes against the juice or the simulator, was coated in a different way, as shown in the table. The oxygen barrier layer in all the samples studied comprised a similar EVOH layer. The LPDE grade was the same as that of the other surface. The tie layer comprised a polyethylene-based grafted adhesive polymer. The EMA polymer of the first sample, its coating weight being 31 g/m², was an EMA-based adhesive polymer, Bynel 4288. The EMA polymer of the second sample, with a weight of 29 g/m², was the commercially available Elvaloy 1609 AC, its MA content being 9 mole percent. Naturally, the said polymer products used in the EMA layer are not the only feasible ones, but most polymer manufacturers sell corresponding EMA products. The third and fourth samples, which comprised no EMA layers, were reference samples.

| Sandwich structure | Coating weights (g/m²) | Scalping of D-limonene from juice (μg/dm²) | Scalping of D-limonene from simulator (μg/dm²) |
|---|---|---|---|
| LDPE/board/EVOH/TIE/EMA/LDPE | 20/300/6/6/31/6 | 196 | 138 |
| LDPE/board/EVOH/TIE/EMA | 20/300/6/6/29 | 235 | 119 |
| LDPE/board/EVOH/TIE/LDPE | 20/300/6/5/31 | 366 | 218 |
| LDPE/board/EVOH/TIE/LDPE | 20/300/6/6/34 | 367 | 211 |

The results of the study show that by using the EMA layer according to the invention, the scalping of D-limonene by the liquid packaging board is considerably lower than in the reference samples corresponding to the prior art, wherein there was a fairly thick LDPE heat-sealing layer with a weight of 31 to 34 g/m² against the juice.

Example 2

Scalping of D-limonene from the orange juice by various sandwich structures were also studied as a function of time, i.e., so as how the storage period or the incubation time effected the scalping of D-limonene by the samples that were studied. Generally, the incubation time is the time the juice is stored in the container that is manufactured from the test material. Generally, the duration of the scalping test is 42 hours, but herein two other test durations, 72 h and 138 h, were also used.

In the tests, the liquid was kept in bags made of the material to be tested, a separate bag for each scalping measurement, respectively. In the measurements, the polymer coating was detached and the limonene was evaporated from the polymer. The results are shown in the following table, wherein the first two materials represent the invention and the third one comprises the reference material.

| Sandwich structure | Coating weights (g/m²) | Scalping of D-limonene from juice (μg/dm²) 42 h | Scalping of D-limonene from juice (μg/dm²) 72 h | Scalping of D-limonene from juice (μg/dm²) 168 h |
|---|---|---|---|---|
| LDPE/BOARD/EVOH/TIE/EMA/LDPE | 20/300/6/6/31/6 | 228 | 282 | 206 |
| LDPE/BOARD/EVOH/TIE/EMA | 20/300/6/6/29 | 104 | 150 | 71 |
| LDPE/BOARD/EVOH/TIE/LDPE | 20/300/6/6/34 | 234 | 347 | 181 |

Also in this test for a long storage period, the liquid packaging board provided with the EMA layer according to the invention proved to have good properties; therefore, the liquid packaging board according to the invention appears to have good prerequisites for providing a liquid package, inside of which the product can be stored for a relatively long storage period compared with the reference material.

Example 3

Scalping of D-limonene by various sandwich structures was measured as a function of time. The limonene-containing liquids comprised orange juice and the stimulator according to Example 1. The testing periods were 42 hours, 72 hours, and 168 hours.

| Sandwich structure | Coating thickness (μm) | Scalping of D-limonene from juice (μg/dm²) 42 h | Scalping of D-limonene from juice (μg/dm²) 72 h | Scalping of D-limonene from juice (μg/dm²) 168 h |
|---|---|---|---|---|
| LDPE/BOARD/EVOH/TIE/EMA/LDPE | 23/318/6/6/25/6 | 525 | 402 | 417 |
| LDPE/BOARD/EVOH/TIE/EMA | 23/318/6/6/30 | 226 | 263 | 204 |
| LDPE/BOARD/EVOH/TIE/LDPE | 23/318/6/5/30 | 643 | 466 | 587 |

| Sandwich structure | Coating thickness (μm) | Scalping of D-limonene from simulator (μg/dm²) 42 h | Scalping of D-limonene from simulator (μg/dm2) 72 h | Scalping of D-limonene from simulator (μg/dm2) 168 h |
|---|---|---|---|---|
| LDPE/BOARD/EVOH/TIE/EMA/LDPE | 23/318/6/6/25/6 | 189 | 203 | 195 |
| LDPE/BOARD/EVOH/TIE/EMA | 23/318/6/6/30 | 79 | 124 | 106 |
| LDPE/BOARD/EVOH/TIE/LDPE | 23/318/6/5/30 | 265 | 305 | 340 |

Example 4

The applicability of the EMA surface layer of the board according to the invention to the production conditions was studied by comparing a considerable factor for the processing of the packaging blank, i.e., the frictional properties. In the tests, it was observed that there were slight differences in the values of both the static and the dynamic frictions compared with the LDPE layer representing the conventional structure; however, the differences were not significant. Accordingly, the processability also meets the requirements of applicability to production.

|  | Friction coefficient Static friction | Friction coefficient Dynamic friction |
|---|---|---|
| Background/LDPE surface | 0.733 | 0.716 |
| Background/EMA surface | 0.861 | 0.823 |

The invention claimed is:

1. A method of decreasing flavour scalping of D-limonene from citrus fruit juice which comprises placing the juice in a closed juice package that is formed from ethylene methyl acrylate copolymer (EMA) and that is closed by heat sealing, in order to decrease the flavour scalping from the packaged product, the EMA layer having a weight of 15 to 50 g/m², wherein an inner surface layer of said closed juice package in contact with the packaged product comprises EMA.

2. The method according to claim 1 wherein EMA is employed in a rectangular prism-shaped or a gable-top package as the inner layer of the base board.

3. A method of decreasing flavour scalping from citrus fruit juice which comprises placing the citrus fruit juice in a closed juice package of citrus fruit juice, which is made by folding and heat sealing from polymer-coated packaging board that comprises a base board, a polymer layer outside the same, constituting the outer surface of the package, and an oxygen barrier layer and at least one polymer layer, which are inside the base board in the package, characterized in that the package comprises a layer of ethylene methyl acrylate copolymer (EMA) lying inside the base board and the oxygen barrier layer to decrease the flavour scalping from the packaged product, the EMA layer having a weight of 15 to 50 g/m², wherein an inner surface layer of said closed juice package in contact with the packaged product comprises EMA.

4. The method according to claim 3, wherein EMA is employed in a citrus fruit juice package that is closed by heat sealing to decrease the scalping of D-limonene.

5. The method according to claim 3, wherein EMA is employed in a rectangular prism-shaped or a gable-top package as the inner layer of the base board.

6. A method of decreasing flavour scalping from citrus fruit juice, which method comprises:
    providing a package by folding polymer-coated packaging board that comprises a base board, a polymer layer outside the same constituting the outer surface of the package, an oxygen barrier layer, and at least one polymer layer, which are inside the base board in the package, characterized in that said at least one polymer layer comprises a layer of ethylene methyl acrylate copolymer (EMA) lying inside the base board and the oxygen barrier layer to decrease the flavour scalping from the packaged product, the EMA layer having a weight of 15 to 50 g/m², wherein an inner surface layer of the package in contact with said citrus juice comprises EMA which has a weight of at most 10 g/m² in contact with said citrus juice;
    placing said citrus fruit juice in said package; and
    closing and heat-sealing said package,
thereby providing a closed package of citrus fruit juice in which flavour scalping of said citrus juice is inhibited.

* * * * *